United States Patent
Chern et al.

(10) Patent No.: US 9,874,759 B2
(45) Date of Patent: Jan. 23, 2018

(54) METHOD FOR SCALING STRUCTURED LIGHT PATTERN AND OPTICAL DEVICE USING THE SAME

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: Everready Precision Ind. Corp., Kaohsiung (TW)

( * ) Notice: Subject to any disclaimer, the term of this patent is extended or adjusted under 35 U.S.C. 154(b) by 212 days.

(21) Appl. No.: 14/860,333

(22) Filed: Sep. 21, 2015

(65) Prior Publication Data
US 2017/0038033 A1    Feb. 9, 2017

(30) Foreign Application Priority Data
Aug. 7, 2015    (TW) .............................. 104125783 A

(51) Int. Cl.
| G02B 27/18 | (2006.01) |
|---|---|
| G02B 27/42 | (2006.01) |
| G02B 27/09 | (2006.01) |
| G01B 11/25 | (2006.01) |
| H04L 9/00 | (2006.01) |

(52) U.S. Cl.
CPC ...... *G02B 27/0938* (2013.01); *G01B 11/2513* (2013.01); *G02B 27/095* (2013.01); *G02B 27/0944* (2013.01); *H04L 9/00* (2013.01)

(58) Field of Classification Search
CPC ............ G02B 27/0938; G02B 27/0944; G02B 27/095; G02B 27/0977; G02B 5/0278; G02B 5/0205; G02B 5/1814; G02B 5/18; F21V 5/04
See application file for complete search history.

(56) References Cited

U.S. PATENT DOCUMENTS

| 9,482,877 | B2 * | 11/2016 | Janssens | ................ G02B 27/48 |
|---|---|---|---|---|
| 2009/0185274 | A1 * | 7/2009 | Shpunt | ............... G02B 27/0944 |
| | | | | 359/558 |
| 2010/0254020 | A1 * | 10/2010 | Govyadinov | ...... G02B 27/0944 |
| | | | | 359/641 |
| 2015/0131142 | A1 * | 5/2015 | Matsumoto | ............ G02B 26/06 |
| | | | | 359/316 |
| 2015/0323799 | A1 * | 11/2015 | Cayer | ................ G02B 27/0927 |
| | | | | 359/558 |

* cited by examiner

Primary Examiner — Peggy Neils
(74) Attorney, Agent, or Firm — Muncy, Geissler, Olds & Lowe, P.C.

(57) ABSTRACT

A method for scaling a structured light pattern and an optical device using the method are provided. The optical device includes a structured light generation unit and a conversion lens module. The conversion lens module is arranged between the structured light generation unit and a projection surface. The structured light generation unit outputs a structured light. After plural light beams of the structured light pass through the conversion lens module, the plural light beams are projected on the projection surface, so that a structured light pattern is formed on the projection surface. By controlling the conversion lens module to change traveling directions of the light beams of the structured light, the structured light pattern on the projection surface is correspondingly enlarged or shrunken.

17 Claims, 14 Drawing Sheets

50a

50b

50c

50d

METHOD FOR SCALING STRUCTURED LIGHT PATTERN AND OPTICAL DEVICE USING THE SAME

FIELD OF THE INVENTION

The present invention relates to an optical device, and more particularly to an optical device for outputting a structured light.

BACKGROUND OF THE INVENTION

A structured light is a lighting with a specified pattern. With current optical technologies and their developments, the structured lighting can be designed to have a linear line, a planar with dot, stripe, or cross patterns, a grid pattern or even a more complicated light pattern. Consequently, the structured light can be applied to many fields, such as three-dimensional (3D) contour regeneration, distance measurement, anti-counterfeiting recognition, and so on. In other words, the applications of the structured light is emergently increased and the associated technologies have been widely researched and developed.

Please refer to FIGS. 1, 2A and 2B. FIG. 1 schematically illustrates a structured light projected to an object. FIG. 2A schematically illustrates the structured light pattern on the surface of the object, in which the distance between a structured light generation unit and the object is shorter. FIG. 2B schematically illustrates the structured light pattern on the surface of the object, in which the distance between the structured light generation unit and the object is longer.

As shown in FIGS. 1, 2A and 2B, a structured light generation unit 1 is used for projecting a structured light 2 to an object. When the light beams 21 of the structured light 2 are projected on the object, a structured light pattern 20 is formed on a surface 31 of the object. Moreover, the structured light 2 outputted from the structured light generation unit 1 has a beam diffusion angle θ, as to specified the extension range, in a kind of field angle, formed by the structured lighting. As the traveling distance of the light beams 21 of the structured light 2 increases, the coverage region of the structured light 2 is widened. That is, if the distance between the object and the structured light generation unit 1 is shorter, the structured light pattern 20a on the surface 31 of the object is smaller (see FIG. 2A). Whereas, if the distance between the object and the structured light generation unit 1 is longer, the structured light pattern 20b on the surface 31 of the object is larger (see FIG. 2B).

As mentioned above, the size of the structured light pattern 20 increases with the increasing distance between the object and the structured light generation unit 1. However, as the size of the structured light pattern 20 increases, the resolution of the structured light pattern 20 on the surface 31 of the object reduces. In case that the size of the structured light pattern 20b on the surface 31 of the object increases to a certain extent, the resolution thereof is too small to be utilized.

Therefore, there is a need of providing a scheme to increase the resolution of the structured light pattern in order to overcome the above drawbacks.

SUMMARY OF THE INVENTION

An objective of present invention is to provide a method for scaling a structured light pattern and an optical device using the method. By controlling a conversion lens module arranged between the structured light generation unit and a projection surface, the structured light pattern on the projection surface is shrunken or enlarged. Consequently, the resolution of the structured light pattern is adjustable.

In accordance with an aspect of the present invention, there is an optical device which can meet the target demands. The optical device optical device includes a structured light generation unit and a conversion lens module. The structured light generation unit outputs a structured light. The conversion lens module is arranged between the structured light generation unit and a screen (projection surface), which is the target surface to be projected. After plural light beams of the structured light pass through the conversion lens module, the plural light beams are projected on the projection surface, so that a structured light pattern is formed on the projection surface. By controlling the conversion lens module to change traveling directions of the light beams of the structured light passing through the conversion lens module, the structured light pattern on the projection surface is correspondingly enlarged or shrunken.

In an embodiment, the structured light pattern on the projection surface is correspondingly enlarged or shrunken when an equivalent focal length of the conversion lens module is adjusted, or the structured light pattern on the projection surface is correspondingly enlarged or shrunken when a working distance between the conversion lens module and the structured light generation unit is adjusted.

In an embodiment, if a half angle of beam diffusion of the structured light relative to a first coordinate axis x and a half angle of beam diffusion of the structured light relative to a second coordinate axis y before the light beams of the structured light pass through the conversion lens module are identical, the optical device will work well and satisfy effectively:

$$\theta_n \cong \tan^{-1}\left[\left(\frac{W_d}{f} - 1\right)\tan(\theta_i)\right],$$

wherein $\theta_i$ is a half angle of beam diffusion of the structured light before passing through the conversion lens module, $\theta_n$ is a half angle of beam diffusion of the structured light after passing through the conversion lens module, f is the equivalent focal length (efl) of the conversion lens module, and $W_d$ is the working distance between the conversion lens module and the structured light generation unit. In other words, with employing a lens (by selecting one useful effective focal length) and by adjusting the working distance, the structured lighting pattern can be scaled as one wished.

In an embodiment, if a half angle of beam diffusion of the structured light relative to a first coordinate axis x and a half angle of beam diffusion of the structured light relative to a second coordinate axis y before the light beams of the structured light pass through the conversion lens module are different, the optical device satisfies following mathematic formulae:

$$\theta_{n,x} \cong \tan^{-1}\left[\left(\frac{W_d}{f_x} - 1\right)\tan(\theta_{i,x})\right];$$

and $$\theta_{n,y} \cong \tan^{-1}\left[\left(\frac{W_d}{f_y} - 1\right)\tan(\theta_{i,y})\right],$$

wherein $\theta_{i,x}$ is a half angle of beam diffusion of the structured light relative to the first coordinate axis x before passing through the conversion lens module, $\theta_{n,x}$ is a half angle of beam diffusion of the structured light relative to the first coordinate axis x after passing through the conversion lens module, $f_x$ is an equivalent focal length of the conversion lens module relative to the first coordinate axis x, $\theta_{i,y}$ is a half angle of beam diffusion of the structured light relative to the second coordinate axis y before passing through the conversion lens module, $\theta_{n,y}$ is a half angle of beam diffusion of the structured light relative to the second coordinate axis y after passing through the conversion lens module, $f_y$ is an equivalent focal length of the conversion lens module relative to the second coordinate axis y, and $W_d$ is the working distance between the conversion lens module and the structured light generation unit. In other words, with employing an bi-conic lens (by selecting different but useful effective focal lengths for two orthogonal directions) and by adjusting the corresponding working distance, the structured lighting pattern can be scaled as one wished.

In an embodiment, the structured light generation unit comprises a light source and an optical element group, wherein the optical element group comprises a diffractive optical element, a refractive optical element and/or a reflective optical element corresponding to the structured light pattern.

In an embodiment, the structured light generation unit further includes a collimating lens group. The collimating lens group is arranged between the light source and the optical element group. After source beams from the light source are collimated by the collimating lens group, the collimated source beams are directed to the optical element group.

In an embodiment, the light source comprises a laser diode (LD), a light emitting diode (LED) and/or an organic light emitting diode (OLED). The source beams from the light source have wavelengths in a first wavelength range, a second wavelength range and/or a thermal band.

In an embodiment, the conversion lens module comprises a photomask structure, and the photomask structure is attached on a surface of the conversion lens module, wherein the photomask structure has a photomask pattern set.

In an embodiment, the photomask pattern set includes at least one of a hole pattern set, a spot pattern set, a rectangular pattern set, a concentric pattern set, a grid pattern set and a radiation pattern set.

In an embodiment, the photomask structure includes plural microstructures, which are at least partially or completely light-transmissible. The plural microstructures are in an array arrangement or in a non-array arrangement.

In an embodiment, the plural microstructures are symmetrically distributed on the surface or asymmetrically distributed on the surface.

In an embodiment, a thickness of the photomask structure is smaller than or equal 0.2 mm.

In an embodiment, the conversion lens module includes a first diffractive structure, and the first diffractive structure is attached on a first surface of the conversion lens module.

In an embodiment, the first surface of the conversion lens module where the first diffractive structure is attached is a flat surface, a spherical surface or an aspheric surface.

In an embodiment, the first surface of the conversion lens module where the first diffractive structure is attached satisfies a mathematic formula:

$$\phi(r) = dor \frac{2\pi}{\lambda_0}(df0 + df1 \cdot r^2 + df2 \cdot r^4 + df3 \cdot r^6 + df4 \cdot r^8 + \dots),$$

wherein $\phi(r)$ is a phase function, r is a radius vector, dor is a diffraction order, $\lambda_0$ is a wavelength of a light beam passing through the surface, df0 is a zero-order coefficient, df1 is a second-order coefficient, df2 is a fourth-order coefficient, df3 is a sixth-order coefficient, and df4 is an eighth-order coefficient.

In an embodiment, both of the zero-order coefficient df0 and the second-order coefficient df1 in the mathematic formula are zero.

In an embodiment, an n-th order coefficient and an (n+2)-th order coefficient in the mathematic formula are respectively a positive coefficient and a negative coefficient, or the n-th order coefficient and the (n+2)-th order coefficient in the mathematic formula are respectively a negative coefficient and a positive coefficient, wherein n is an even number larger than or equal to 4.

In an embodiment, a thickness of the first diffractive structure is smaller than or equal 0.15 mm.

In an embodiment, the conversion lens module further comprises a second diffractive structure, and the second diffractive structure is attached on a second surface of the conversion lens module, wherein the first surface is arranged between the second surface and the projection surface, wherein the first surface and the second surface satisfy mathematic formulae:

$$A_2 \cdot (f_1)^2 > A_1 \cdot (f_2)^2; \text{ or}$$

$$A_2 \cdot (f_1)^2 \cong A_1 \cdot (f_2)^2,$$

wherein $A_1$ is an optically effective area of the second surface, $A_2$ is an optically effective area of the first surface, $f_1$ is an equivalent focal length of the second surface, and $f_2$ is an equivalent focal length of the first surface.

In an embodiment, the conversion lens module further includes a second diffractive structure, and the second diffractive structure is attached on a second surface of the conversion lens module. The plural light beams of the structured light are differentially processed by the first diffractive structure and the second diffractive structure according to optical diffraction.

In accordance with another aspect of the present invention, there is provided a method for scaling a structured light pattern to shrink or enlarge the structured light pattern on a projection surface. Firstly, a structured light generation unit and a conversion lens module are provided. The conversion lens module is arranged between the structured light generation unit and the projection surface. The structured light generation unit outputs a structured light. After plural light beams of the structured light pass through the conversion lens module, the plural light beams are projected on the projection surface, so that the structured light pattern is formed on the projection surface. Then, by adjusting an equivalent focal length of the conversion lens module and/or a working distance between the conversion lens module and the structured light generation unit, the traveling directions of the light beams of the structured light passing through the conversion lens module are changed, so that the structured light pattern on the projection surface is correspondingly enlarged or shrunken.

In an embodiment, if a half angle of beam diffusion of the structured light relative to a first coordinate axis x and a half angle of beam diffusion of the structured light relative to a second coordinate axis y before the light beams of the structured light pass through the conversion lens module are identical, the optical device satisfies a mathematic formula:

$$\theta_n \cong \tan^{-1}\left[\left(\frac{W_d}{f} - 1\right)\tan(\theta_i)\right],$$

wherein $\theta_i$ is a half angle of beam diffusion of the structured light before passing through the conversion lens module, $\theta_n$ is a half angle of beam diffusion of the structured light after passing through the conversion lens module, f is the equivalent focal length of the conversion lens module, and $W_d$ is the working distance between the conversion lens module and the structured light generation unit.

In an embodiment, if a half angle of beam diffusion of the structured light relative to a first coordinate axis x and a half angle of beam diffusion of the structured light relative to a second coordinate axis y before the light beams of the structured light pass through the conversion lens module are different, the optical device satisfies following mathematic formulae:

$$\theta_{n,x} \cong \tan^{-1}\left[\left(\frac{W_d}{f_x} - 1\right)\tan(\theta_{i,x})\right];$$

and $$\theta_{n,y} \cong \tan^{-1}\left[\left(\frac{W_d}{f_y} - 1\right)\tan(\theta_{i,y})\right],$$

wherein $\theta_{i,x}$ is a half angle of beam diffusion of the structured light relative to the first coordinate axis x before passing through the conversion lens module, $\theta_{n,x}$ is a half angle of beam diffusion of the structured light relative to the first coordinate axis x after passing through the conversion lens module, $f_x$ is an equivalent focal length of the conversion lens module relative to the first coordinate axis x, $\theta_{i,y}$ is a half angle of beam diffusion of the structured light relative to the second coordinate axis y before passing through the conversion lens module, $\theta_{n,y}$ is a half angle of beam diffusion of the structured light relative to the second coordinate axis y after passing through the conversion lens module, $f_y$ is an equivalent focal length of the conversion lens module relative to the second coordinate axis y, and $W_d$ is the working distance between the conversion lens module and the structured light generation unit.

In an embodiment, the method further includes a step of filtering noise of portions of the plural light beams having a specified wavelength range at a high spatial frequency when the plural light beams of the structured light pass through the conversion lens module, so that the structural light pattern has increased edge luminance or pattern contrast.

In an embodiment, the method further includes a step of optically diffracting portions of the plural light beams having a specified wavelength range when the plural light beams of the structured light pass through the conversion lens module, so that the structural light pattern has increased edge luminance or pattern contrast.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
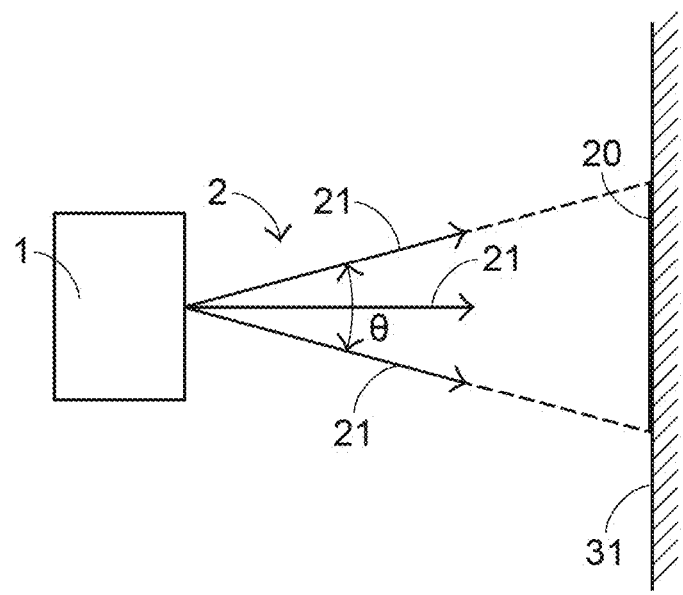
FIG. 1 schematically illustrates a structured light projected to an object.
Figure 2A:
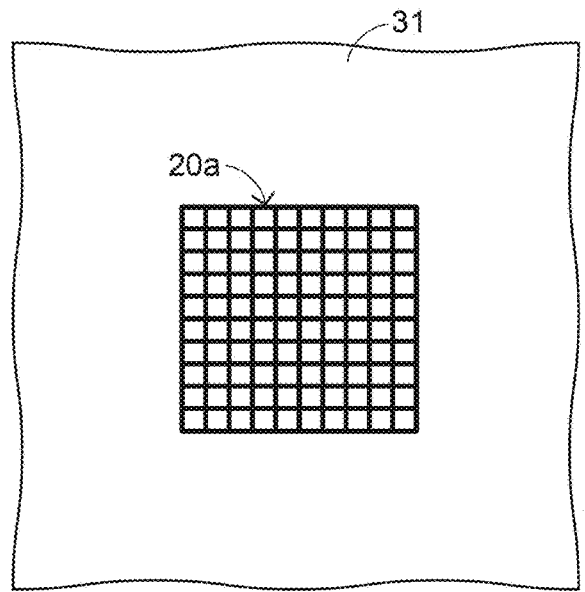
FIG. 2A schematically illustrates the structured light pattern on the surface of the object, in which the distance between a structured light generation unit and the object is shorter.
Figure 2B:
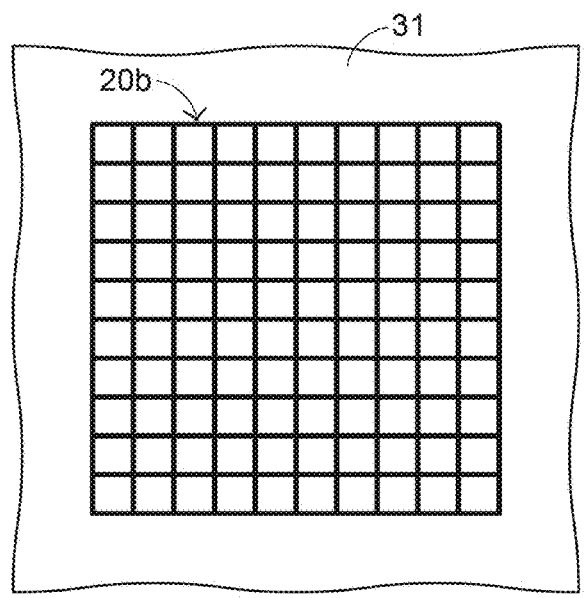
FIG. 2B schematically illustrates the structured light pattern on the surface of the object, in which the distance between the structured light generation unit and the object is longer.
Figure 3:
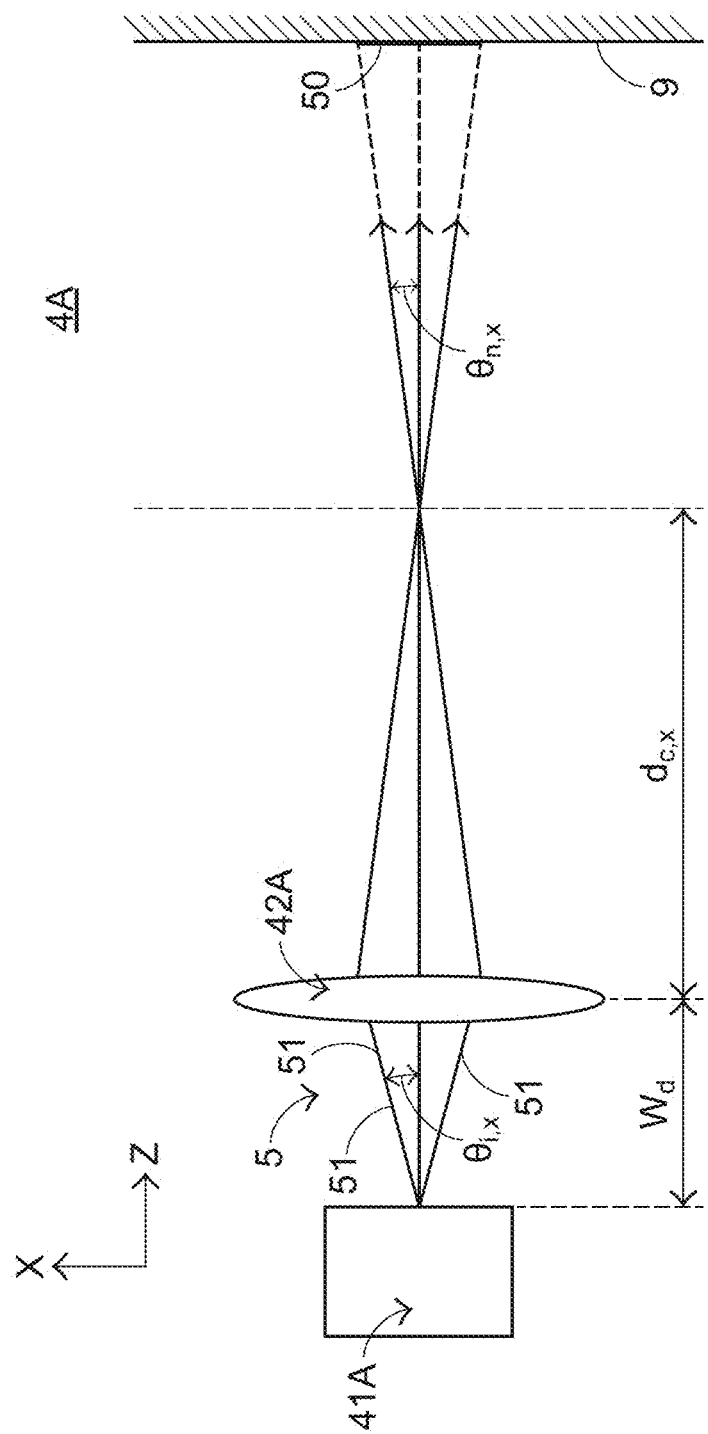
FIG. 3 is a schematic view illustrating an optical device according to a first embodiment of the present invention.
Figure 4:
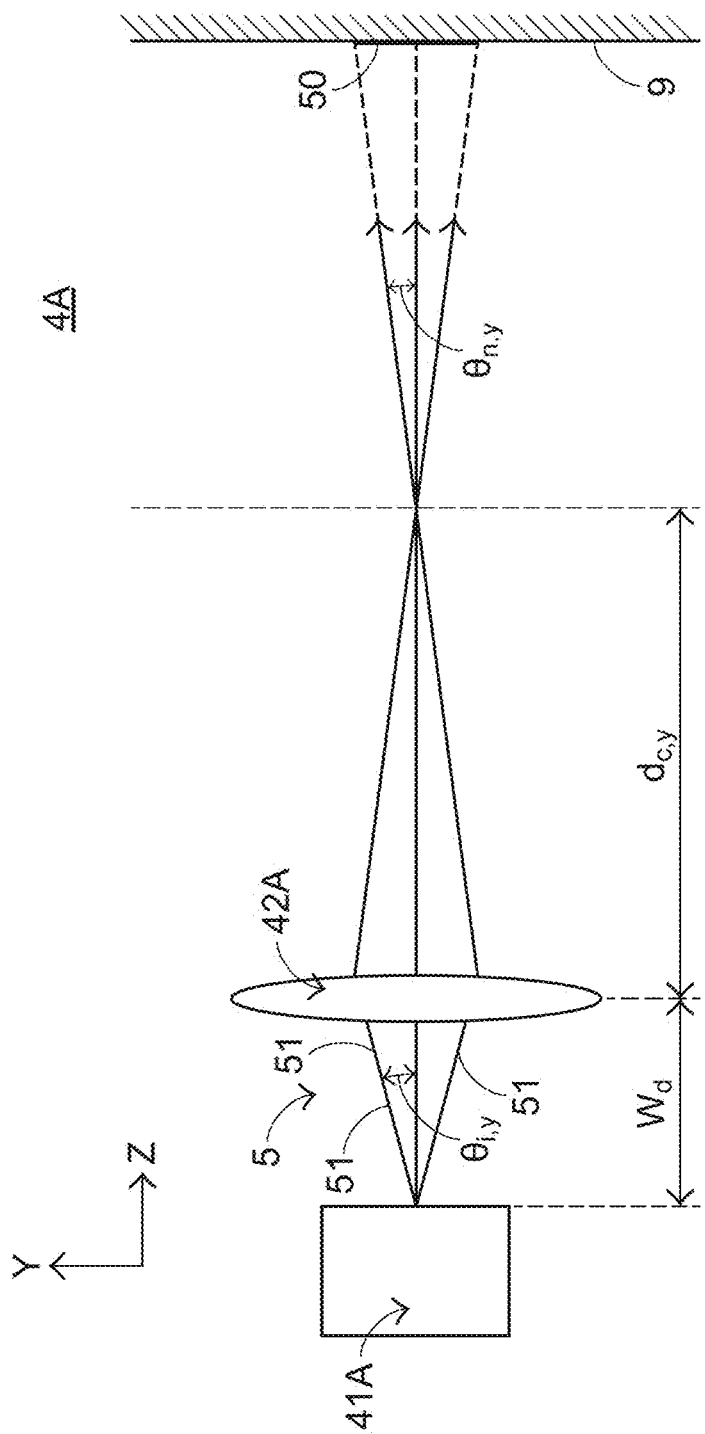
FIG. 4 is a schematic view illustrating the optical device of FIG. 3 and taken along another viewpoint.
Figure 5:
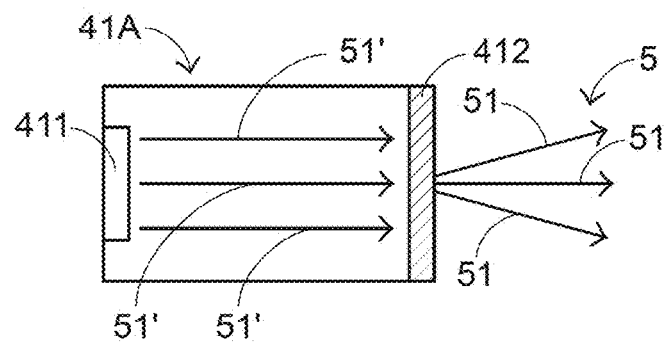
FIG. 5 is a schematic view illustrating a structured light generation unit of the optical device of FIG. 3.

Please refer to FIGS. 3-5. FIG. 3 is a schematic view illustrating an optical device according to a first embodiment of the present invention. FIG. 4 is a schematic view illustrating the optical device of FIG. 3 and taken along another viewpoint. FIG. 5 is a schematic view illustrating a structured light generation unit of the optical device of FIG. 3.

In FIG. 3, the optical device 4A is taken at a viewpoint (x-z) corresponding to a first coordinate axis x and a third coordinate axis z. In FIG. 4, the optical device 4A is taken at a viewpoint (y-z) corresponding to a second coordinate axis y and the third coordinate axis z. The first coordinate axis x, the second coordinate axis y and the third coordinate axis z are perpendicular to each other.

The optical device 4A comprises a structured light generation unit 41A and a conversion lens module 42A. The structured light generation unit 41A is used for generating a structured light 5. The conversion lens module 42A is arranged between the structured light generation unit 41A and a projection surface 9. After plural light beams 51 of the structured light 5 from the structured light generation unit 41A pass through the conversion lens module 42A, the traveling directions of the light beams 51 are changed. In particular, after the plural light beams 51 of the structured light 5 from the structured light generation unit 41A pass through the conversion lens module 42A, the light beams 51 are projected on the projection surface 9. Consequently, a structural light pattern 50 is formed on the projection surface 9. In FIGS. 3 and 4, only a single component of the conversion lens module 42A is shown. It is noted that the conversion lens module 42A is composed of plural lenses according to the practical requirements.

In this embodiment, the structured light generation unit 41A comprises a light source 411 and an optical element group. The optical element group comprises a diffractive optical element (DOE) 412, a refractive optical element and/or a reflective optical element. The light source 411 is used for providing plural source beams 51'. After the plural source beams 51' pass through the optical element group, the structured light 5 is generated. In this embodiment, after the plural source beams 51' from the light source 411 pass through the diffractive optical element 412, the structured light 5 is generated. Alternatively, in another embodiment, the structured light is generated after the plural source beams 51' from the light source 411 pass through a refractive optical element and a reflective optical element.

The diffractive optical element 412 is designed according to the practical requirements. In particular, when the source beams 51' pass through the diffractive optical element 412, the source beams 51' are shaped by the diffractive optical element 412. Consequently, the structured light 5 outputted from the structured light generation unit 41A can be flexibly adjusted. That is, the structural light pattern 50 on the projection surface 9 can be designed. The ways of designing the diffractive optical element 412 and generating the desired structured light 5 by the diffractive optical element 412 are well known to those skilled in the art, and are not redundantly described herein.

Moreover, the diffractive optical element 412 is designed according to the optical diffraction theory. That is, the diffractive optical element 412 is a phase-type optical element. For example, the diffractive optical element 412 is fabricated by a semiconductor processing technology, a direct writing technology, a holographic technology or a point diamond turning technology.

Preferably but not exclusively, the diffractive optical element may satisfy the following mathematic formulae:

$\varphi(r) = \Sigma \varphi_i$, and $i=1,2,\ldots N;$ where, $r^2 = x^2 + y^2;$ $\phi_i = dor \cdot \left(\dfrac{2\pi}{\lambda}\right) \cdot df_i(x^j)(y^k);$ $i = (j+k)^2 + j + 3k;$ $j = o - k;$ $k = i - \dfrac{o \cdot (o+1)}{2};$ $o = \text{floor}\left[\dfrac{\sqrt{1+8i} - 1}{2}\right].$ In the above mathematic formulae, $\varphi(r)$ is a phase function, r is a radius vector, dor is the diffraction order, $\lambda$ is a wavelength of a light beam passing through the diffractive optical element, and $df_i$ is a diffraction coefficient. The above mathematic formula is well known to those skilled in the art, and is not redundantly described herein.

The light source 411 comprises a laser diode (LD), a light emitting diode (LED), an organic light emitting diode (OLED), or any other comparable light emitting element similar to at least one of the laser diode, the light emitting diode and the organic light emitting diode. The wavelengths of the source beams 51' from the light source 411 are in a first wavelength range and/or a second wavelength range. For example, the source beams 51' from the light source 411 are visible beams, invisible beams or light beams in a thermal band.

As mentioned above, after the plural light beams 51 of the structured light 5 pass through the conversion lens module 42A, the traveling directions of the light beams 51 are changed. Consequently, the half angle of beam diffusion before the light beams 51 of the structured light 5 pass through the conversion lens module 42A and the half angle of beam diffusion after the light beams 51 of the structured light 5 pass through the conversion lens module 42A are different. As shown in FIG. 3, the half angle of beam diffusion of the structured light 5 relative to the first coordinate axis x before passing through the conversion lens module 42A is $\theta_{i,x}$, and the half angle of beam diffusion of the structured light 5 relative to the first coordinate axis x after passing through the conversion lens module 42A is $\theta_{n,x}$, wherein $\theta_{i,x}$ and $\theta_{n,x}$ are different. As shown in FIG. 4, the half angle of beam diffusion of the structured light 5 relative to the second coordinate axis y before passing through the conversion lens module 42A is $\theta_{i,y}$, and the half angle of beam diffusion of the structured light 5 relative to the second coordinate axis y after passing through the conversion lens module 42A is $\theta_{n,y}$, wherein $\theta_{i,y}$ and $\theta_{n,y}$ are different.

Moreover, according to the Gaussian image mathematic formula and the trigonometric function, the optical device 4A may satisfy the following mathematic formulae:

$d_{c,x} = \dfrac{f_x \cdot W_d}{W_d - f_x};$ $\theta_{n,x} \cong \tan^{-1}\left[\left(\dfrac{W_d}{f_x} - 1\right)\tan(\theta_{i,x})\right];$ $d_{c,y} = \dfrac{f_y \cdot W_d}{W_d - f_y};$ and $\theta_{n,y} \cong \tan^{-1}\left[\left(\dfrac{W_d}{f_y} - 1\right)\tan(\theta_{i,y})\right].$ In the above mathematic formulae, $f_x$ is an equivalent focal length of the conversion lens module 42A relative to the first coordinate axis x, $d_{c,x}$ is an image distance of the conversion lens module 42A relative to the first coordinate axis x, $f_y$ is an equivalent focal length of the conversion lens module 42A relative to the second coordinate axis y, $d_{c,y}$ is an image distance of the conversion lens module 42A relative to the second coordinate axis y, and $W_d$ is a working distance between the conversion lens module 42A and the structured light generation unit 41A.

According to the above mathematic formulae, the following results can be deduced. For example, by changing the equivalent focal length $f_x$ of the conversion lens module 42A relative to the first coordinate axis x or changing the working distance $W_d$ between the conversion lens module 42A and the structured light generation unit 41A, the half angle of beam diffusion of the structured light 5 relative to the first coordinate axis x after passing through the conversion lens module 42A is adjustable. Consequently, the structural light pattern 50 on the projection surface 9 relative to the first coordinate axis x can be enlarged or shrunken (i.e., scaled). Moreover, by changing the equivalent focal length $f_y$ of the conversion lens module 42A relative to the second coordinate axis y or changing the working distance $W_d$ between the conversion lens module 42A and the structured light generation unit 41A, the half angle $\theta_{n,y}$ of beam diffusion of the structured light 5 relative to the second coordinate axis y after passing through the conversion lens module 42A relative to the second coordinate axis y is adjustable. Since the size of the structural light pattern 50 on the projection surface 9 is changeable, the resolution of the structural light pattern 50 can be flexibly adjusted in order to comply with the practical requirements.

In case that the half angle $\theta_{i,x}$ of beam diffusion of the structured light 5 relative to the first coordinate axis x and the half angle $\theta_{i,y}$ of beam diffusion of the structured light 5 relative to the second coordinate axis y before the light beams 51 of the structured light 5 pass through the conversion lens module 42A are identical, the above mathematic formulae of the optical device 4A may be simplified by the following mathematic formulae:

$$d_c = \frac{f \cdot W_d}{W_d - f};$$

$$\theta_n \cong \tan^{-1}\left[\left(\frac{W_d}{f} - 1\right)\tan(\theta_i)\right].$$

In the above mathematic formulae, $d_c$ is an image distance of the conversion lens module 42A, f is an equivalent focal length of the conversion lens module 42A, $\theta_i$ is a half angle of beam diffusion of the structured light 5 before passing through the conversion lens module 42A, and $\theta_n$ is a half angle of beam diffusion of the structured light 5 after passing through the conversion lens module 42A.

According to the above simplified mathematic formulae, the following results can be deduced. By changing the equivalent focal length f of the conversion lens module 42A or changing the working distance $W_d$ between the conversion lens module 42A and the structured light generation unit 41A, the half angle $\theta_n$ of beam diffusion of the structured light 5 after passing through the conversion lens module 42A is adjustable. Consequently, the structural light pattern 50 on the projection surface 9 can be enlarged or shrunken. Since the size of the structural light pattern 50 on the projection surface 9 is changeable, the resolution of the structural light pattern 50 can be flexibly adjusted in order to comply with the practical requirements.

Figure 6:
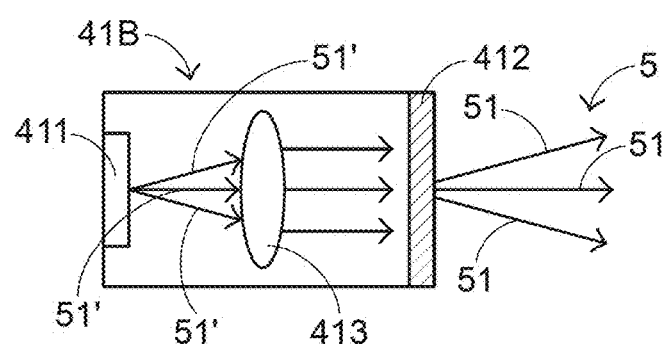
FIG. 6 is a schematic view illustrating a structured light generation unit of an optical device of according to a second embodiment of the present invention.

FIG. 6 is a schematic view illustrating a structured light generation unit of an optical device of according to a second embodiment of the present invention. The components of the optical device of this embodiment which are similar to the optical device of the first embodiment are not redundantly described herein. In comparison with the first embodiment, the structured light generation unit 41B of this embodiment further comprises a collimating lens group 413. The collimating lens group 413 is arranged between the light source 411 and the diffractive optical element 412. By the collimating lens group 413, the plural source beams 51' from the light source 411 are in parallel with each other and directed to the diffractive optical element 412.

Generally, the portions of the source beams that are not collimated cannot be utilized by the diffractive optical element 412. In this embodiment, the plural source beams 51' from the light source 411 are collimated by the collimating lens group 413. Consequently, the plural source beams 51' are all in parallel with each other to be directed to the diffractive optical element 412. Under this circumstance, the light utilization efficiency of the optical device is enhanced. In FIG. 6, only a single component of the collimating lens group 413 is shown. It is noted that the collimating lens group 413 is composed of plural lenses according to the practical requirements.

Figure 7:
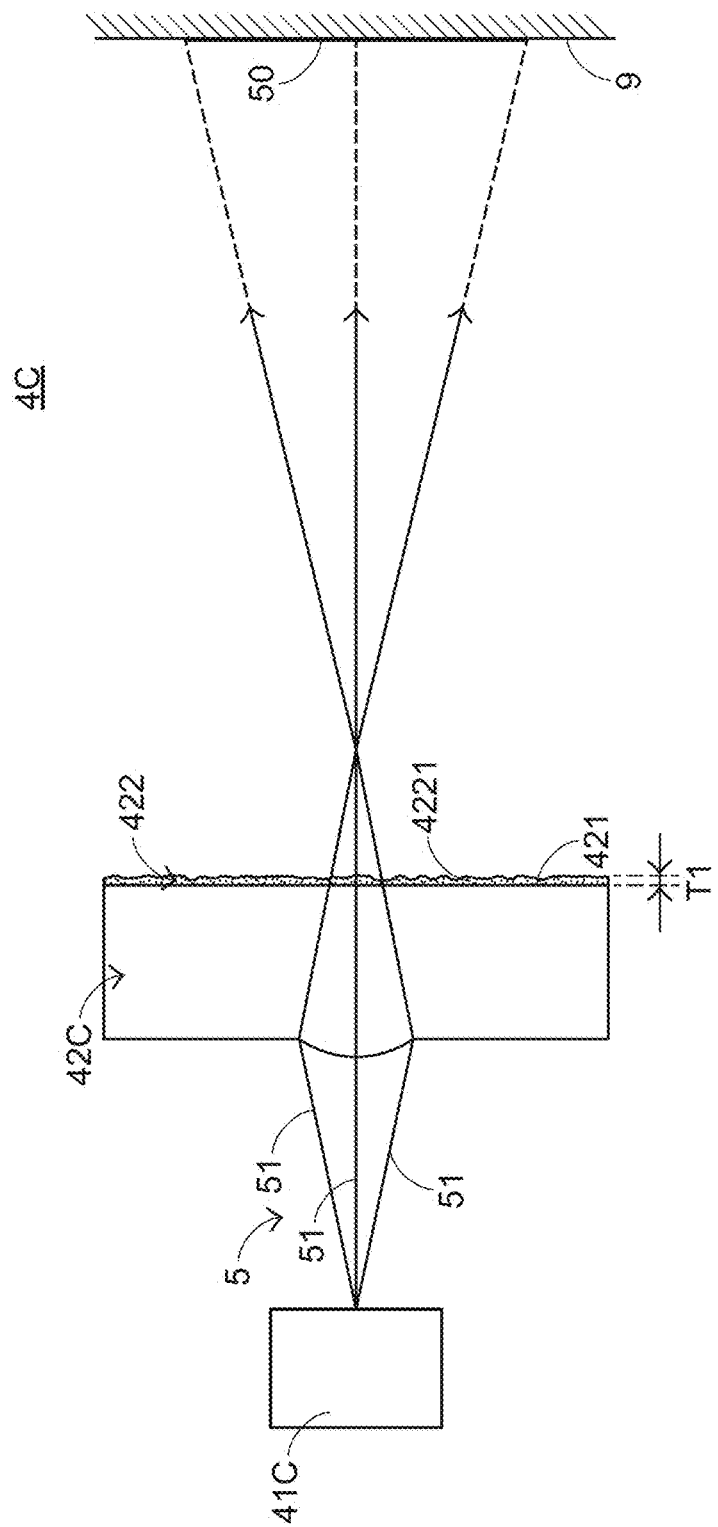
FIG. 7 is a schematic view illustrating an optical device of according to a third embodiment of the present invention.

FIG. 7 is a schematic view illustrating an optical device of according to a third embodiment of the present invention. The components of the optical device 4C of this embodiment which are similar to the optical devices of the first embodiment and the second embodiment are not redundantly described herein. In comparison with the first embodiment and the second embodiment, the conversion lens module 42C of this embodiment further comprises a photomask structure 422. The photomask structure 422 is attached on a surface 421 of the conversion lens module 42C. Moreover, according to the practical requirements, the photomask structure 422 is light-transmissible in an irregular form or light-transmissible in a regular form.

Preferably but not restricted, the photomask structure 422 comprises plural microstructures 4221, which are at least partially or completely light-transmissible. Moreover, according to the practical requirements, these microstructures 4221 are in an array arrangement or in an irregular (i.e., non-array) arrangement. Moreover, according to the practical requirements, these microstructures 4221 are symmetrically distributed on the attached surface 421 of the conversion lens module 42C or asymmetrically distributed on the attached surface 421 of the conversion lens module 42C.

Figure 8A:
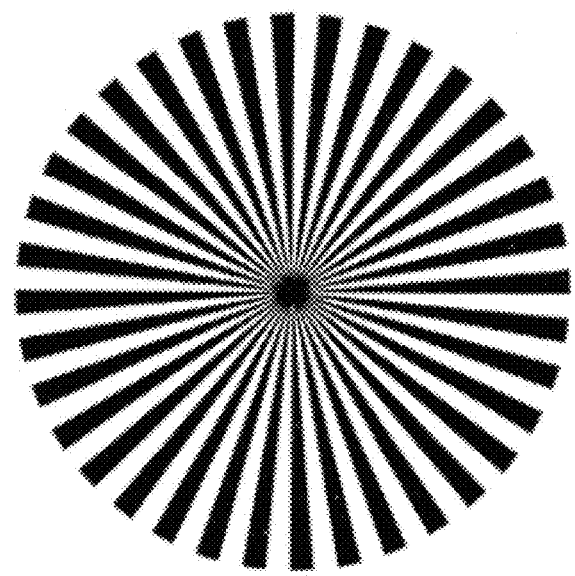
FIG. 8A is a schematic view illustrating an example of a photomask pattern set used in the optical device of the present invention.
Figure 8B:
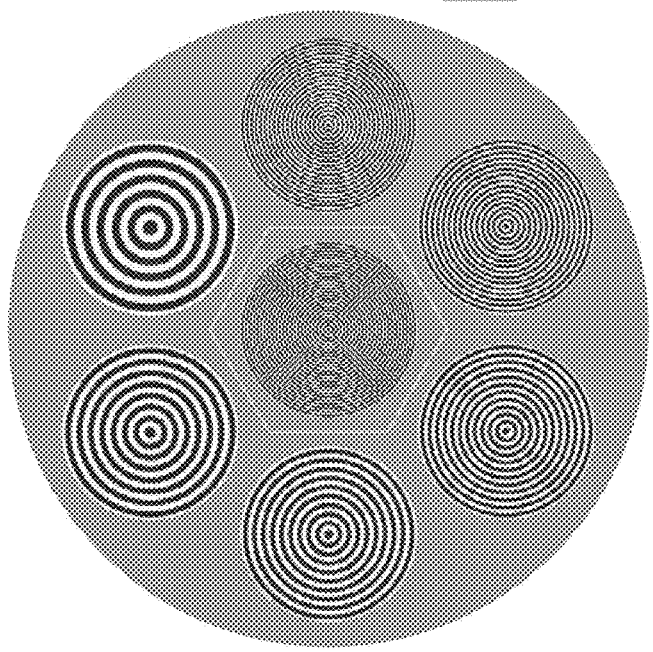
FIG. 8B is a schematic view illustrating another example of a photomask pattern set used in the optical device of the present invention.

Moreover, the photomask structure 422 comprises a photomask pattern set 4222. The photomask pattern set 4222 is composed of these microstructures 4221. Moreover, the photomask pattern set 4222 comprises a hole pattern set (e.g., a single hole pattern or a combination of plural hole patterns), a spot pattern set (e.g., a single spot pattern or a combination of plural spot patterns), a rectangular pattern set (e.g., a single rectangular pattern or a combination of plural rectangular patterns), a concentric pattern set (e.g., a single concentric pattern or a combination of plural concentric patterns), a grid pattern set (e.g., a single grid pattern or a combination of plural grid patterns), a radiation pattern set (e.g., a single radiation pattern or a combination of plural radiation patterns), or an combination thereof. For example, two examples of the photomask pattern set are shown in FIGS. 8A and 8B.

In this embodiment, the thickness T1 of the photomask structure 422 is smaller than or equal to 0.2 mm. Moreover, the photomask structure 422 is used for filtering noise of the plural light beams 51 at a high spatial frequency. Consequently, the structural light pattern 50 on the projection surface 9 has increased edge luminance or pattern contrast.

Figure 9A:
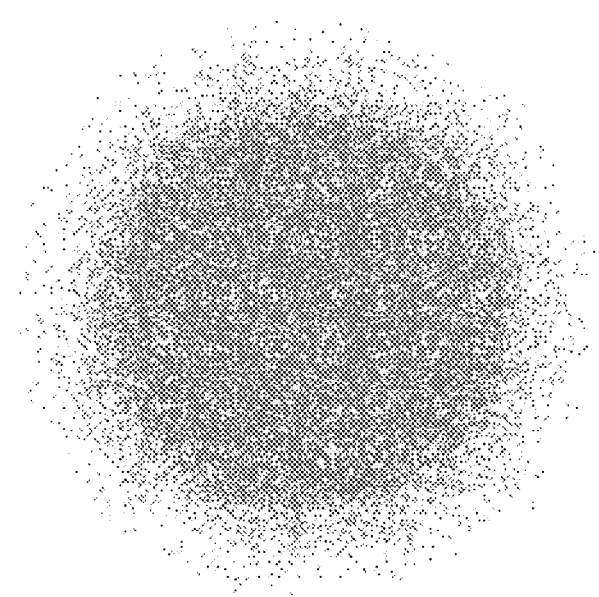
FIG. 9A is a schematic view illustrating the structural light pattern on the projection surface, in which the conversion lens module of the optical device comprises the photomask structure.
Figure 9B:
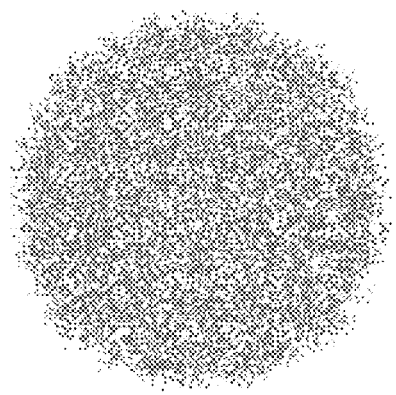
FIG. 9B is a schematic view illustrating the structural light pattern on the projection surface, in which the conversion lens module of the optical device does not comprise the photomask structure.

The function of the photomask structure can be realized by comparing the structural light patterns of FIGS. 9A and 9B. FIG. 9A is a schematic view illustrating the structural light pattern on the projection surface, in which the conversion lens module of the optical device comprises the photomask structure. FIG. 9B is a schematic view illustrating the structural light pattern on the projection surface, in which the conversion lens module of the optical device does not comprise the photomask structure. As shown in FIG. 9A, the edge of the structural light pattern 50a at the high spatial frequency has more noise. As shown in FIG. 9B, the noise at the edge of the structural light pattern 50b at the high spatial frequency is obviously filtered off. In other words, the edge luminance of the structural light pattern 50b is enhanced.

Moreover, according to the practical requirement, the photomask structure 422 may be specially designed to filter the noise of the light beams 51 having different wavelength ranges at different high spatial frequencies or filter the noise of the light beams 51 having a specified wavelength range at the high spatial frequency. Consequently, the structural light pattern 50 on the projection surface 9 and corresponding to the specified wavelength range has increased edge luminance or pattern contrast.

Figure 10:
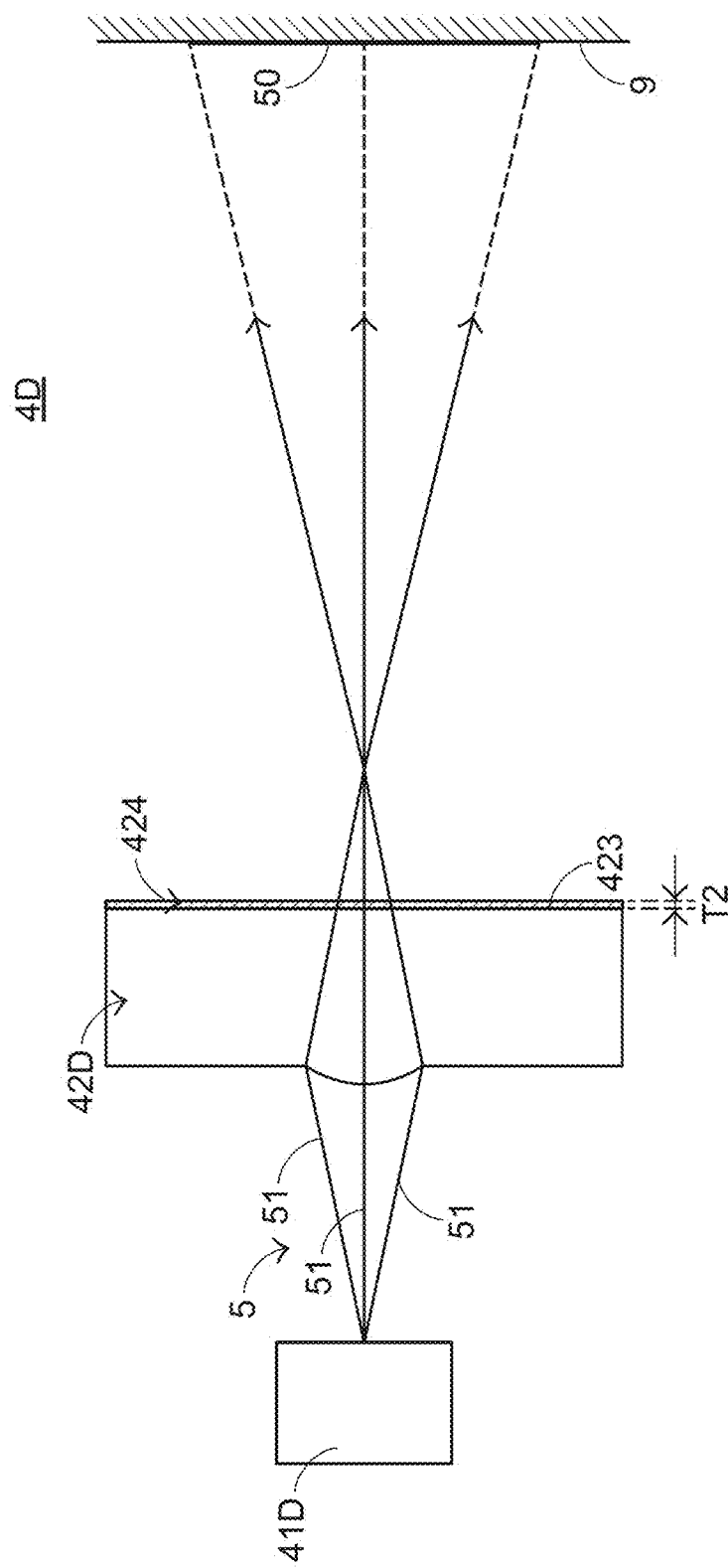
FIG. 10 is a schematic view illustrating an optical device of according to a fourth embodiment of the present invention.

FIG. 10 is a schematic view illustrating an optical device of according to a fourth embodiment of the present invention. The components of the optical device 4D of this embodiment which are similar to the optical devices of the first embodiment and the second embodiment are not redundantly described herein. In comparison with the first embodiment and the second embodiment, the conversion lens module 42D of this embodiment further comprises a diffractive structure 424. The diffractive structure 424 is attached on a surface 423 of the conversion lens module 42D. Moreover, the surface 423 where the diffractive structure 424 is attached is a flat surface, a spherical surface or an aspheric surface.

Moreover, the surface 423 where the diffractive structure 424 is attached satisfies a mathematic formula:

$$\phi(r) = dor \frac{2\pi}{\lambda_0}(df0 + df1 \cdot r^2 + df2 \cdot r^4 + df3 \cdot r^6 + df4 \cdot r^8 + \ldots).$$

In the above mathematic formula, $\phi(r)$ is a phase function, r is a radius vector, dor is a diffraction order, $\lambda_0$ is a wavelength of the light beam 51 passing through the surface 423 where the diffractive structure 424 is attached, df0 is a zero-order coefficient, df1 is a second-order coefficient, df2 is a fourth-order coefficient, df3 is a sixth-order coefficient, and df4 is an eighth-order coefficient. If the surface 423 where the diffractive structure 424 is attached is a flat surface, both of the zero-order coefficient df0 and the second-order coefficient df1 are zero.

Preferably but not exclusively, the n-th order coefficient and the (n+2)-th order coefficient in the mathematic formula are respectively a positive (+) coefficient and a negative (−) coefficient, or the n-th order coefficient and the (n+2)-th order coefficient in the mathematic formula are respectively a negative (−) coefficient and a positive (+) coefficient, wherein n is an even number larger than or equal to 4. For example, signs of the fourth-order coefficient df2, the sixth-order coefficient df3 and the eighth-order coefficient df4 are respectively (+, −, +) or (−, +, −). By this design, the surface 423 where the diffractive structure 424 is attached has a wave shape with turning points. Since the phase is adjusted, the sharpness and contrast of the structural light pattern 50 on the projection surface 9 are enhanced.

In this embodiment, the thickness T2 of the diffractive structure 424 is smaller than or equal to 0.15 mm. After the plural light beams 51 pass through the diffractive structure 424, the light beams 51 are optically diffracted by the diffractive structure 424. Consequently, the structural light pattern 50 on the projection surface 9 has increased edge luminance or pattern contrast.

Figure 11A:
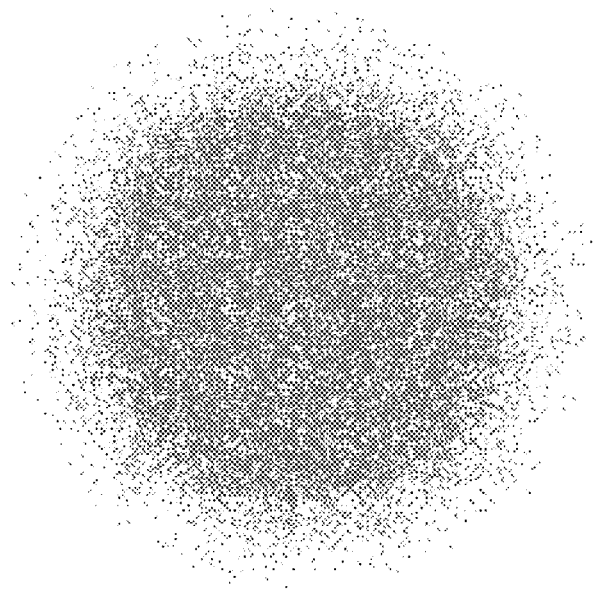
FIG. 11A is a schematic view illustrating the structural light pattern on the projection surface, in which the conversion lens module of the optical device comprises the diffractive structure.
Figure 11B:
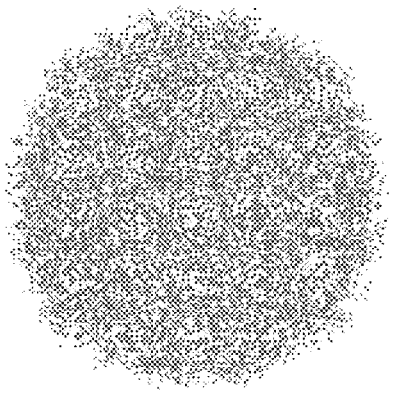
FIG. 11B is a schematic view illustrating the structural light pattern on the projection surface, in which the conversion lens module of the optical device does not comprise the diffractive structure.

The function of the diffractive structure can be realized by comparing the structural light patterns of FIGS. 11A and 11B. FIG. 11A is a schematic view illustrating the structural light pattern on the projection surface, in which the conversion lens module of the optical device comprises the diffractive structure. FIG. 11B is a schematic view illustrating the structural light pattern on the projection surface, in which the conversion lens module of the optical device does not comprise the diffractive structure. As shown in FIG. 11A, the edge of the structural light pattern 50c at the high spatial frequency has more noise. As shown in FIG. 11B, the noise at the edge of the structural light pattern 50b at the high spatial frequency is obviously filtered off. In other words, the edge luminance of the structural light pattern 50d is enhanced.

Moreover, according to the practical requirement, the diffractive structure 424 may be specially designed to differentially process the light beams 51 having different wavelength ranges according to optical diffraction, or only process the light beams 51 having a specified wavelength range according to optical diffraction. Consequently, the structural light pattern 50 on the projection surface 9 and corresponding to the specified wavelength range has increased edge luminance or pattern contrast.

Figure 12:
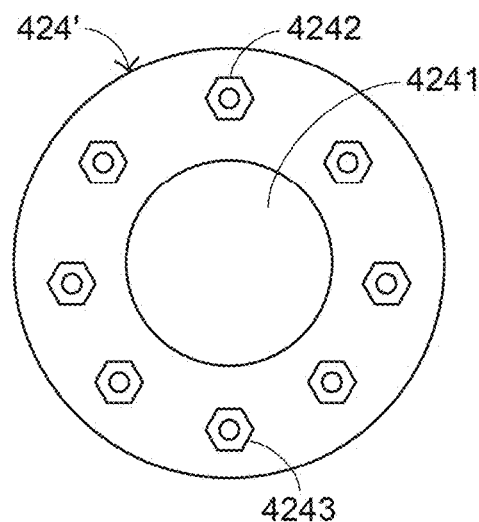
FIG. 12 is a schematic view illustrating the diffractive structure used in the optical device of FIG. 10.
Figure 13:
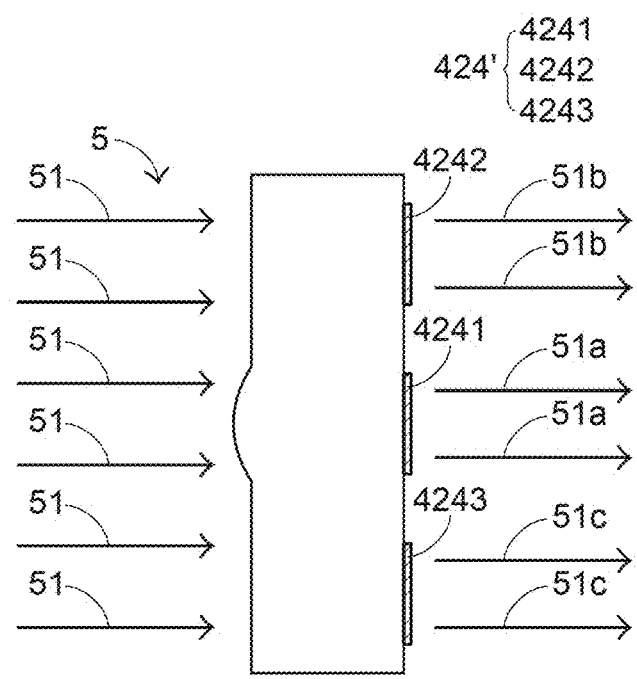
FIG. 13 is a schematic view illustrating the concepts of optically processing the plural beams having plural wavelength ranges by the diffractive structure of FIG. 12.

FIG. 12 is a schematic view illustrating the diffractive structure used in the optical device of FIG. 10. FIG. 13 is a schematic view illustrating the concepts of optically processing the plural beams having plural wavelength ranges by the diffractive structure of FIG. 12. Please refer to FIGS. 12 and 13. The diffractive structure 424' has a first diffractive pattern zone 4241, a second diffractive pattern zone 4242 and a third diffractive pattern zone 4243. When the plural light beams 51 having plural wavelength regions are projected on the diffractive structure 424', the light beams 51 are optically diffracted by the first diffractive pattern zone 4241, the second diffractive pattern zone 4242 and the third diffractive pattern zone 4243. Consequently, the light beams 51a having a first wavelength region are outputted from the first diffractive pattern zone 4241 and directed to the projection surface 9, the light beams 51b having a second wavelength region are outputted from the second diffractive pattern zone 4242 and directed to the projection surface 9, and the light beams 51c having a third wavelength region are outputted from the third diffractive pattern zone 4243 and directed to the projection surface 9.

Figure 14:
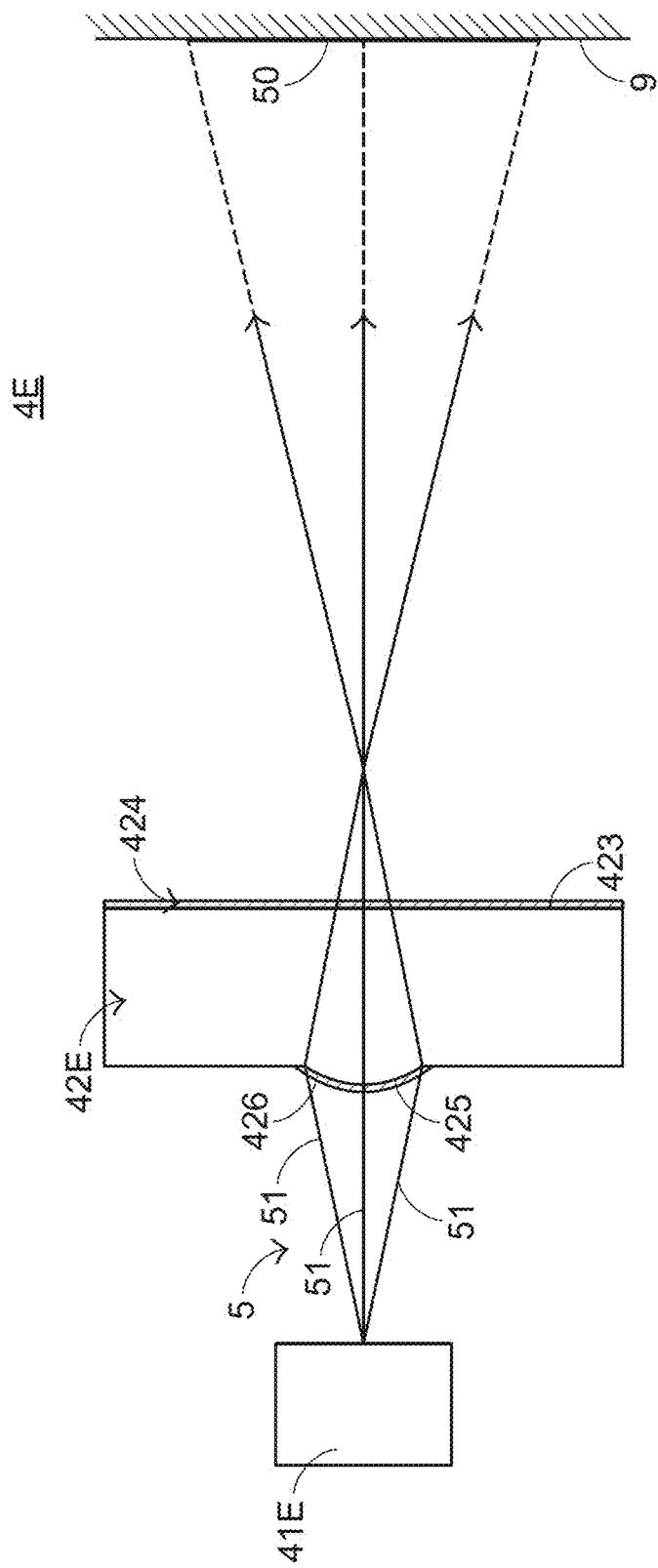
FIG. 14 is a schematic view illustrating an optical device of according to a fifth embodiment of the present invention.

FIG. 14 is a schematic view illustrating an optical device of according to a fifth embodiment of the present invention. The components of the optical device 4E of this embodiment which are similar to the optical devices of the fourth embodiment are not redundantly described herein. In comparison with the fourth embodiment, the conversion lens module 42E of this embodiment further comprises a second diffractive structure 426. The second diffractive structure 426 is attached on a second surface 425 of the conversion lens module 42E.

For increasing the overall optical efficiency and the maximizing the energy utilization, the surface 423 where the diffractive structure 424 is attached and the second surface 425 wherein the second diffractive structure 426 is attached satisfy the following mathematic formulae:

$$A_2 \cdot (f_1)^2 > A_1 \cdot (f_2)^2; \text{ or}$$

$$A_2 \cdot (f_1)^2 \cong A_1 \cdot (f_2)^2.$$

In the above mathematic formulae, $A_1$ is the optically effective area of the surface 425, $A_2$ is the optically effective area of the surface 423, $f_1$ is an equivalent focal length of the surface 425, and $f_2$ is an equivalent focal length of the surface 423.

Figure 15:
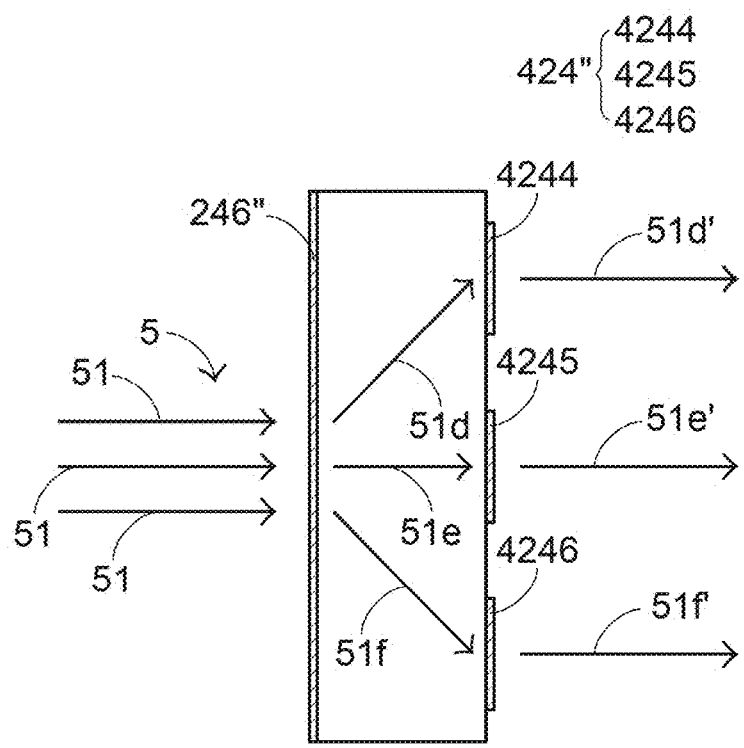
FIG. 15 is a schematic view illustrating a conversion lens module used in an optical device of according to a sixth embodiment of the present invention.

In an embodiment, the two diffractive structures are used to differentially process the light beams according to optical diffraction. FIG. 15 is a schematic view illustrating a conversion lens module used in an optical device of according to a sixth embodiment of the present invention. As shown in FIG. 15, the diffractive structure 426" is a grating-based structure. After the light beams 51 having plural wavelength regions pass through the diffractive structure 426", the light beams are directed to different zones of the diffractive structure 424". That is, after the light beams 51 having plural wavelength regions pass through the diffractive structure 426", the light beams 51 are split into light beams 51d, 51e and 51f. The light beams 51d have a first wavelength region, the light beams 51e have a second wavelength region, and the light beams 51f have a third wavelength region. The diffractive structure 424" has a first diffractive pattern zone 4244, a second diffractive pattern zone 4245 and a third diffractive pattern zone 4246. Consequently, the light beams 51d are guided to the first diffractive pattern zone 4244 of the diffractive structure 424", the light beams 51e are guided to the second diffractive pattern zone 4245 of the diffractive structure 424", and the light beams 51f are guided to the third diffractive pattern zone 4246 of the diffractive structure 424".

When the light beams 51d are projected on the diffractive structure 424', the first diffractive pattern zone 4244, the second diffractive pattern zone 4245 and the third diffractive pattern zone 4246 of the diffractive structure 424" differentially process the light beams 51d, 51e and 51f. For example, the light beams 51d' having the first wavelength region are outputted from the first diffractive pattern zone 4244 of the diffractive structure 424" and directed to a first projection zone (not shown) of the projection surface 9. Consequently, a first structured light pattern (not shown) with a first shape is formed on the first projection zone. Moreover, the light beams 51e' having the second wavelength region are outputted from the second diffractive pattern zone 4245 of the diffractive structure 424" and directed to a second projection zone (not shown) of the projection surface 9. Consequently, a second structured light pattern (not shown) with a second shape is formed on the second projection zone. Moreover, the light beams 51f' having the third wavelength region are outputted from the third diffractive pattern zone 4246 of the diffractive structure 424" and directed to a third projection zone (not shown) of the projection surface 9. Consequently, a third structured light pattern (not shown) with a third shape is formed on the third projection zone.

Figure 16:
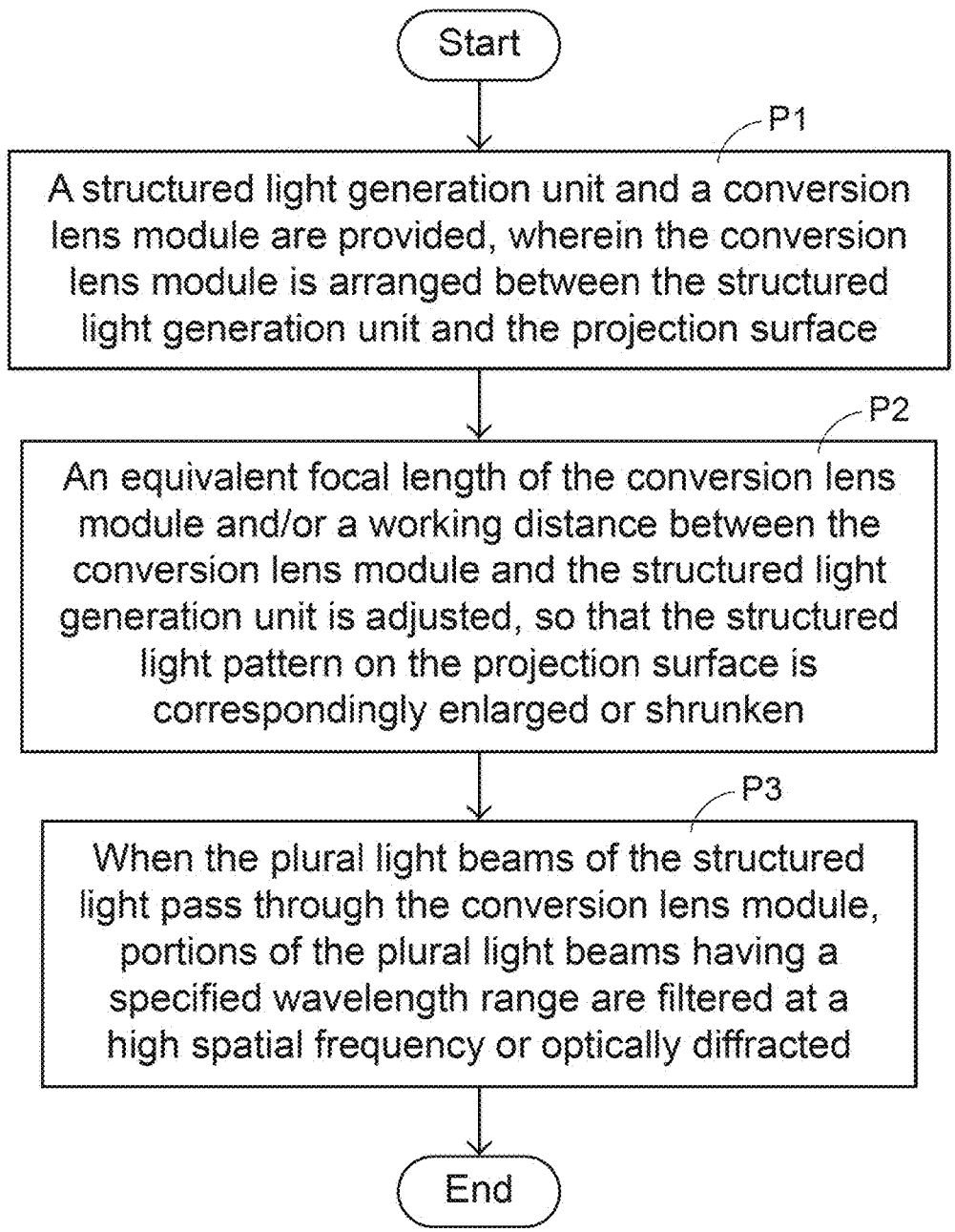
FIG. 16 is a flowchart illustrating a method for scaling a structured light pattern.

FIG. 16 is a flowchart illustrating a method for scaling a structured light pattern. In a step P1, a structured light generation unit and a conversion lens module are provided, wherein the conversion lens module is arranged between the structured light generation unit and a projection surface, and the structured light generation unit outputs a structured light. After plural light beams of the structured light pass through the conversion lens module, the plural light beams are projected on the projection surface, so that the structured light pattern is formed on the projection surface. In a step P2, an equivalent focal length of the conversion lens module and/or a working distance between the conversion lens module and the structured light generation unit is adjusted, so that traveling directions of the light beams of the structured light passing through the conversion lens module are changed. Consequently, the structured light pattern on the projection surface is correspondingly enlarged or shrunken. In a step P3, portions of the plural light beams having a specified wavelength range are filtered at a high spatial frequency or optically diffracted when the plural light beams of the structured light pass through the conversion lens module. Consequently, the structural light pattern on the projection surface has increased edge luminance or pattern contrast.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An optical device, comprising:
a structured light generation unit outputting a structured light; and
a conversion lens module arranged between the structured light generation unit and a projection surface, wherein after plural light beams of the structured light pass through the conversion lens module, the plural light beams are projected on the projection surface, so that a structured light pattern is formed on the projection surface,
wherein by controlling the conversion lens module to change traveling directions of the light beams of the structured light passing through the conversion lens module, the structured light pattern on the projection surface is correspondingly enlarged or shrunken in response to adjusting equivalent focal length of the conversion lens module or adjusting a working distance between the conversion lens module and the structured light generation unit, and
wherein if a half angle of beam diffusion of the structured light relative to a first coordinate axis x and a half angle of beam diffusion of the structured light relative to a second coordinate axis y before the light beams of the structured light pass through the conversion lens module are identical, the optical device satisfies a mathematic formula:

$$\theta_n \cong \tan^{-1}\left[\left(\frac{W_d}{f} - 1\right)\tan(\theta_i)\right],$$

wherein $\theta_i$ is a half angle of beam diffusion of the structured light before passing through the conversion lens module, $\theta_n$ is a half angle of beam diffusion of the structured light after passing through the conversion lens module, f is the equivalent focal length of the conversion lens module, and $W_d$ is the working distance between the conversion lens module and the structured light generation unit, and wherein if a half angle of beam diffusion of the structured light relative to a first coordinate axis x and a half angle of beam diffusion of the structured light relative to a second coordinate axis y before the light beams of the structured light pass through the conversion lens module are different, the optical device satisfies following mathematic formulae:

$$\theta_{n,x} \cong \tan^{-1}\left[\left(\frac{W_d}{f_x} - 1\right)\tan(\theta_{i,x})\right];$$

and $$\theta_{n,y} \cong \tan^{-1}\left[\left(\frac{W_d}{f_y} - 1\right)\tan(\theta_{i,y})\right],$$

wherein $\theta_{i,x}$ is a half angle of beam diffusion of the structured light relative to the first coordinate axis x before passing through the conversion lens module, $\theta_{n,x}$ is a half angle of beam diffusion of the structured light relative to the first coordinate axis x after passing through the conversion lens module, $f_x$ is an equivalent focal length of the conversion lens module relative to the first coordinate axis x, $\theta_{i,y}$ is a half angle of beam diffusion of the structured light relative to the second coordinate axis y before passing through the conversion lens module, $\theta_{n,y}$ is a half angle of beam diffusion of the structured light relative to the second coordinate axis y after passing through the conversion lens module, $f_y$ is an equivalent focal length of the conversion lens module relative to the second coordinate axis y, and $W_d$ is the working distance between the conversion lens module and the structured light generation unit.

2. The optical device according to claim 1, wherein the structured light generation unit comprises a light source and an optical element group, wherein the optical element group comprises a diffractive optical element, a refractive optical element and/or a reflective optical element corresponding to the structured light pattern.

3. The optical device according to claim 2, wherein the structured light generation unit further comprises a collimating lens group, wherein the collimating lens group is arranged between the light source and the optical element group, wherein after source beams from the light source are collimated by the collimating lens group, the collimated source beams are directed to the optical element group.

4. The optical device according to claim 2, wherein the light source comprises a laser diode (LD), a light emitting diode (LED) and/or an organic light emitting diode (OLED), wherein the source beams from the light source have wavelengths in a first wavelength range, a second wavelength range and/or a thermal band.

5. The optical device according to claim 1, wherein the conversion lens module comprises a photomask structure, and the photomask structure is attached on a surface of the conversion lens module, wherein the photomask structure has a photomask pattern set.

6. The optical device according to claim 5, wherein the photomask pattern set comprises at least one of a hole pattern set, a spot pattern set, a rectangular pattern set, a concentric pattern set, a grid pattern set and a radiation pattern set.

7. The optical device according to claim 5, wherein the photomask structure comprises plural microstructures, which are at least partially or completely light-transmissible, wherein the plural microstructures are in an array arrangement or in a non-array arrangement.

8. The optical device according to claim 7, wherein the plural microstructures are symmetrically distributed on the surface or asymmetrically distributed on the surface.

9. The optical device according to claim 5, wherein a thickness of the photomask structure is smaller than or equal 0.2 mm.

10. An optical device, comprising:
a structured light generation unit outputting a structured light; and
a conversion lens module arranged between the structured light generation unit and a projection surface, wherein after plural light beams of the structured light pass through the conversion lens module, the plural light beams are projected on the projection surface, so that a structured light pattern is formed on the projection surface, wherein the conversion lens module comprises a first diffractive structure, and the first diffractive structure is attached on a first surface of the conversion lens module, and wherein by controlling the conversion lens module to change traveling directions of the light beams of the structured light passing through the conversion lens module, the structured light pattern on the projection surface is correspondingly enlarged or shrunken, and the first surface of the conversion lens module where the first diffractive structure is attached satisfies a mathematic formula:

$$\phi(r) = dor\frac{2\pi}{\lambda_0}(df0 + df1 \cdot r^2 + df2 \cdot r^4 + df3 \cdot r^6 + df4 \cdot r^8 + \dots ),$$

wherein $\varphi(r)$ is a phase function, r is a radius vector, dor is a diffraction order, $\lambda 0$ is a wavelength of a light beam passing through the surface, df0 is a zero-order coefficient, df1 is a second-order coefficient, df2 is a fourth-order coefficient, df3 is a sixth-order coefficient, and df4 is an eighth-order coefficient, and both of the zero-order coefficient df0 and the second-order coefficient df1 in the mathematic formula are zero, and wherein an n-th order coefficient and an (n+2)-th order coefficient in the mathematic formula are respectively a positive coefficient and a negative coefficient, or the n-th order coefficient and the (n+2)-th order coefficient in the mathematic formula are respectively a negative coefficient and a positive coefficient, wherein n is an even number larger than or equal to 4.

11. The optical device according to claim 10, wherein the first surface of the conversion lens module where the first diffractive structure is attached is a flat surface, a spherical surface or an aspheric surface.

12. The optical device according to claim 10, wherein a thickness of the first diffractive structure is smaller than or equal 0.15 mm.

13. The optical device according to claim 10, wherein the conversion lens module further comprises a second diffractive structure, and the second diffractive structure is attached on a second surface of the conversion lens module, wherein the first surface is arranged between the second surface and the projection surface, wherein the first surface and the second surface satisfy mathematic formulae:

$$A_2 \cdot (f_1)^2 > A_1 \cdot (f_2)^2;\ \text{or}$$

$$A_2 \cdot (f_1)^2 \cong A_1 \cdot (f_2)^2,$$

wherein $A_1$ is an optically effective area of the second surface, $A_2$ is an optically effective area of the first surface, $f_1$ is an equivalent focal length of the second surface, and $f_2$ is an equivalent focal length of the first surface.

14. The optical device according to claim 10, wherein the conversion lens module further comprises a second diffractive structure, and the second diffractive structure is attached on a second surface of the conversion lens module, wherein the plural light beams of the structured light are differentially processed by the first diffractive structure and the second diffractive structure according to optical diffraction.

15. A method for scaling a structured light pattern to shrink or enlarge the structured light pattern on a projection surface, the method comprising steps of:
   providing a structured light generation unit and a conversion lens module, wherein the conversion lens module is arranged between the structured light generation unit and the projection surface, and the structured light generation unit outputs a structured light, wherein after plural light beams of the structured light pass through the conversion lens module, the plural light beams are projected on the projection surface, so that the structured light pattern is formed on the projection surface; and
   changing traveling directions of the light beams of the structured light passing through the conversion lens module by adjusting an equivalent focal length of the conversion lens module and/or a working distance between the conversion lens module and the structured light generation unit, so that the structured light pattern on the projection surface is correspondingly enlarged or shrunken, wherein if a half angle of beam diffusion of the structured light relative to a first coordinate axis x and a half angle of beam diffusion of the structured light relative to a second coordinate axis y before the light beams of the structured light pass through the conversion lens module are identical, the optical device satisfies a mathematic formula:

$$\theta_n \cong \tan^{-1}\left[\left(\frac{W_d}{f} - 1\right)\tan(\theta_i)\right],$$

wherein $\theta_i$ is a half angle of beam diffusion of the structured light before passing through the conversion lens module, $\theta_n$ is a half angle of beam diffusion of the structured light after passing through the conversion lens module, f is the equivalent focal length of the conversion lens module, and $W_d$ is the working distance between the conversion lens module and the structured light generation unit, and wherein if a half angle of beam diffusion of the structured light relative to a first coordinate axis x and a half angle of beam diffusion of the structured light relative to a second coordinate axis y before the light beams of the structured light pass through the conversion lens module are different, the optical device satisfies following mathematic formulae:

$$\theta_{n,x} \cong \tan^{-1}\left[\left(\frac{W_d}{f_x} - 1\right)\tan(\theta_{i,x})\right];$$

and $$\theta_{n,y} \cong \tan^{-1}\left[\left(\frac{W_d}{f_y} - 1\right)\tan(\theta_{i,y})\right],$$

wherein $\theta_{i,x}$ is a half angle of beam diffusion of the structured light relative to the first coordinate axis x before passing through the conversion lens module, $\theta_{n,x}$ is a half angle of beam diffusion of the structured light relative to the first coordinate axis x after passing through the conversion lens module, $f_x$ is an equivalent focal length of the conversion lens module relative to the first coordinate axis x, $\theta_{i,y}$ is a half angle of beam diffusion of the structured light relative to the second coordinate axis y before passing through the conversion lens module, $\theta_{n,y}$ is a half angle of beam diffusion of the structured light relative to the second coordinate axis y after passing through the conversion lens module, $f_y$ is an equivalent focal length of the conversion lens module relative to the second coordinate axis y, and $W_d$ is the working distance between the conversion lens module and the structured light generation unit.

16. The method according to claim 15, further comprising a step of filtering noise of portions of the plural light beams having a specified wavelength range at a high spatial frequency when the plural light beams of the structured light pass through the conversion lens module, so that the structural light pattern has increased edge luminance or pattern contrast.

17. The method according to claim 15, further comprising a step of optically diffracting portions of the plural light beams having a specified wavelength range when the plural light beams of the structured light pass through the conversion lens module, so that the structural light pattern has increased edge luminance or pattern contrast.

* * * * *